Mar. 6, 1923.
J. J. ROBINSON.
TESTING DEVICE.
FILED FEB. 16, 1922.
1,447,690.
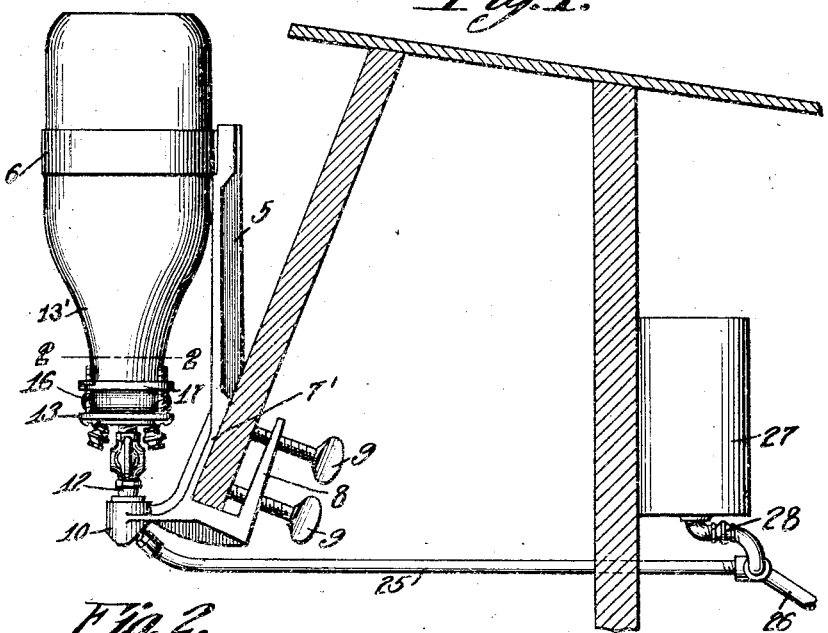
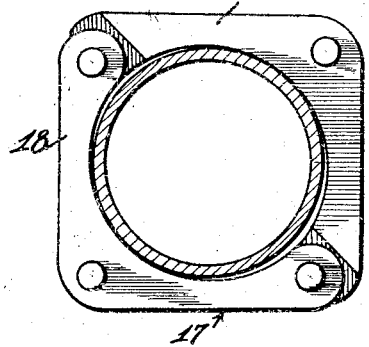
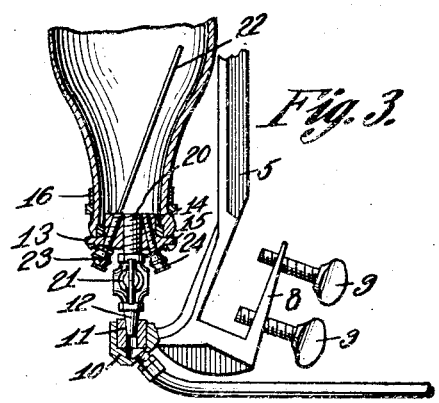
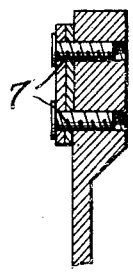
J. J. Robinson, Inventor
Attorneys Patented Mar. 6, 1923.

1,447,690

UNITED STATES PATENT OFFICE.

JONATHAN J. ROBINSON, OF PHILADELPHIA, PENNSYLVANIA.

TESTING DEVICE.

Application filed February 16, 1922. Serial No. 537,126.

*To all whom it may concern:*

Be it known that I, JONATHAN J. ROBINSON, a citizen of the United States, residing at Philadelphia, in the county of Philadelphia and State of Pennsylvania, have invented a new and useful Testing Device, of which the following is a specification.

This invention has reference to testing devices to be employed in connection with motor vehicles, for determining the number of miles that may be traveled by a motor vehicle, with a given quantity of fuel.

An object of the invention is to provide a device of this character which may be readily and easily applied to the instrument board of a vehicle, means being provided to establish communication between the device and fuel supplying pipe line.

A still further object of the invention is the provision of means to insure the fluid passing from the container to insure the motor being properly fed with fuel.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is an elevational view disclosing the device as secured to an instrument board.

Figure 2 is a sectional view taken on line 2—2 of Figure 1.

Figure 3 is a fragmental sectional view through the container and bracket employed for supporting the same.

Figure 4 is a sectional view disclosing the connection between the support and supporting ring.

Referring to the drawing in detail, the device embodies a support indicated generally by the reference character 5, to the upper end of which support is secured a supporting ring 6, the ring being secured as by means of the threaded members 7.

The lower end of the support extends at an angle as indicated at 7' and cooperates with the upwardly extended portion 8 for clamping the support to an instrument board. Set screws 9 extend through suitable openings in the portion 8, which set screws are designed to contact with one surface of the instrument board to clamp the support thereto.

Extending laterally from the support and formed at the base thereof is a head 10, which is formed with an opening to accommodate the gasket 11 that in turn receives the nozzle 12 carried by the permanent cover 13. This permanent cover embodies a body portion 14 or plug adapted to be inserted in the mouth of a bottle, the flanged portion 15 thereof accommodating the screws 16 which pass through the section 17. The section 17 includes hinged elements 18 and 19 which may be clamped around the mouth of a bottle below the bead thereof so that the cover may be secured to the mouth of a bottle against displacement. The nozzle 12 is formed with a threaded portion 20 adapted to be positioned in the body portion 14 of the cap, there being provided a valve member 21 for controlling the passage of fluid from the container 13' through the nozzle.

In order that the passage of the fluid from the container 13 will be assured, an air inlet pipe as indicated at 22, is provided, which has its upper end disposed adjacent to the upper end of the container 13 when the same has been positioned on an instrument board, suitable valve mechanisms indicated at 23 being provided to open or close the pipe. A valve mechanism shown at 24 may also be operated to establish communication between the interior of the container 13 and atmosphere, when the receptacle or container 13 is being filled, the valve mechanism 24 being designed to allow the air in the container to exhaust, when the air is being displaced by the fluid.

A pipe 25 has one end coupled with the head 10 and has its opposite end in communication with the pipe 26 which normally supplies fuel from the vacuum tank 27 to the carburetor of the engine not shown.

The usual cut off valve 28 is provided in the pipe line between the vacuum tank 27 and pipe 26 so that the passage of fluid from the vacuum tank may be controlled at the will of the operator.

In the use of the device, a container capable of containing a quart of gasoline, as for example, is filled with gasoline, and the same positioned in the support as shown by Figure 1 of the drawing.

The support is now clamped on the instrument board of a vehicle, in a manner as illustrated by Figure 1 of the drawing, and the pipe 25 coupled with the pipe 26 leading to the carburetor of the motor.

The valve member 28 is now moved to cut off communication between the pipe 26 and vacuum tank 27. It follows that the valve member 21 is now moved to allow the fuel or gasoline from the container 13' to pass into the pipe 25 and through the pipe 26 to the carburetor.

When the engine has been operated to consume the quantity of gasoline in the container 13, and the speedometer shows five miles traveled, it is obvious that the vehicle will travel at the rate of twenty miles per gallon of gasoline. While I have shown and described the device as including a container having a capacity of one quart, it is to be understood that the size of the container may be varied to accomplish its purpose, according to the will of the person making the test.

Having thus described the invention, what is claimed as new is:—

In a device of the character described, a support, angular clamping means forming a part of the support, for clamping the support to an instrument board, a supporting band carried by the support and adapted to embrace a portion of the container, a cap for the container, means extending through the cap for controlling the passage of fluid from the container, a pipe providing communication between the container and fuel supply pipe of a motor, and means for admitting air to the upper end of the container.

In testimony that I claim the foregoing as my own, I have hereto affixed my signature in the presence of two witnesses.

JONATHAN J. ROBINSON.

Witnesses:
WINFIELD S. H. KNOPF,
MARY E. FOX.